United States Patent
Thomas et al.

(10) Patent No.: US 7,304,570 B2
(45) Date of Patent: Dec. 4, 2007

(54) METHODS, SYSTEMS, AND COMPUTER PROGRAM PRODUCTS FOR PROVIDING CONTEXT-BASED, HIERARCHICAL SECURITY FOR A MOBILE DEVICE

(75) Inventors: Theodosios Thomas, Apex, NC (US); Robert P. Morris, Raleigh, NC (US); Jeffrey S. Bardsley, Durham, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 332 days.

(21) Appl. No.: 11/200,611

(22) Filed: Aug. 10, 2005

(65) Prior Publication Data

US 2007/0035390 A1    Feb. 15, 2007

(51) Int. Cl.
G08B 1/08    (2006.01)
H04Q 7/00    (2006.01)
H04L 9/00    (2006.01)

(52) U.S. Cl. ............ 340/539.11; 340/525; 340/691.6; 455/410; 455/411; 713/166

(58) Field of Classification Search ......... 340/539.11; 455/410; 713/166
See application file for complete search history.

(56) References Cited

U.S. PATENT DOCUMENTS

| 5,493,692 | A | * | 2/1996 | Theimer et al. ......... 455/26.1 |
| 5,848,064 | A | | 12/1998 | Cowan |
| 6,292,898 | B1 | | 9/2001 | Sutherland |
| 6,560,454 | B2 | | 5/2003 | Helle et al. |
| 6,735,434 | B2 | | 5/2004 | Criss et al. |
| 7,184,554 | B2 | * | 2/2007 | Freese ..................... 380/270 |
| 2002/0183043 | A1 | | 12/2002 | Helle et al. |
| 2003/0028652 | A1 | | 2/2003 | Bardini et al. |
| 2003/0032417 | A1 | | 2/2003 | Minear et al. |
| 2003/0143991 | A1 | | 7/2003 | Minear et al. |
| 2003/0162533 | A1 | | 8/2003 | Moles et al. |
| 2004/0152455 | A1 | | 8/2004 | Herle |
| 2004/0177270 | A1 | * | 9/2004 | Little et al. ............. 713/200 |
| 2004/0192280 | A1 | | 9/2004 | Dalton et al. |
| 2004/0214560 | A1 | | 10/2004 | Date et al. |
| 2004/0224674 | A1 | | 11/2004 | O'Farrell et al. |
| 2005/0085222 | A1 | | 4/2005 | Przybilski et al. |
| 2005/0096025 | A1 | | 5/2005 | Qumei et al. |

OTHER PUBLICATIONS

"Secure Systems," http://www.securesystems.com.au/pages/02_technology/04.htm, pp. 1-4 (Publication date unknown, downloaded Jul. 6, 2005).

(Continued)

*Primary Examiner*—Donnie L. Crosland

(57) ABSTRACT

Methods, systems, and computer program products for providing context-based, hierarchical security for a mobile device includes storing a hierarchy of security actions for at least of one of protecting data stored on the mobile device and preventing unauthorized use of the mobile device. The hierarchy includes multiple levels. Each level may include at least one context-based security action. At least one security action associated with a first security level is performed in response to the existence of a first context associated with the first security level. At least one security action associated with a second security level is performed in response to the existence of a second context associated with the second security level.

54 Claims, 4 Drawing Sheets

OTHER PUBLICATIONS

"Cell Phone Security," http://www.snopes.com/crime/prevent/celltheft.asp, p. 1 (2005).

Ashkenazi, Asaf, "Your Smartphone Data May be at Risk," CommsDesign.com, pp. 1-7 (Jun. 2, 2005).

"Afaria Security Manager—Securing Data and Access to Data Held on your Frontline Handheld Devices," iAnywhere.com, pp. 1-2 (2005).

"Inspice Trace—Trace Stolen or Lost Computers," http://www.inspice.com/aprod-code/doc/IT.HTM, pp. 1-2 (2005).

"Laptop Security—Laptop Tracker," http://www.absolute.com/Public/computraceplus/faqs.asp, Absolute Software Corp., pp. 1-3 (2005).

"Mobile Data Security in Version 8.02: Convenience versus Confidentiality," iAnywhere.com, pp. 1-12 (2005).

Cox et al., "iAnywhere Secures Sensitive Business Information Residing on Windows Mobile Smartphones," iAnywhere.com, pp. 1-2 (Jul. 12, 2004).

Cohn, Michael, "Keeping Data Safe," Internet World Magazine, pp. 1-9 (Apr. 1, 2002).

* cited by examiner

METHODS, SYSTEMS, AND COMPUTER PROGRAM PRODUCTS FOR PROVIDING CONTEXT-BASED, HIERARCHICAL SECURITY FOR A MOBILE DEVICE

TECHNICAL FIELD

The subject matter disclosed herein relates to mobile device security. More particularly, the subject matter described herein relates to methods, systems, and computer program products for providing context-based, hierarchical security for a mobile device.

BACKGROUND ART

Mobile devices, such as mobile telephone handsets, personal digital assistance (PDAs), portable computers, etc., often store sensitive information locally on the devices. For example, if the device is a mobile telephone, data stored locally on the device may include telephone numbers, pictures, email addresses, text messages, website history, cookies, documents, etc. As long as the device is in the possession of the authorized user, the sensitive information may be protected from unauthorized access. However, if the device is lost or stolen, without protective measures, the sensitive information may be subject to unauthorized access.

In addition to storing sensitive information, mobile devices also contain functions for which it is desirable to prevent unauthorized use. For example, the calling and messaging capabilities of mobile telephones can generally be used by anyone who activates the phones. Allowing an unauthorized to user to use the mobile phone functionality may result in the authorized user's account incurring charges. In addition, when an unauthorized user uses a mobile device, the unauthorized user can masquerade as the authorized user. For example, if the mobile device is a personal computer, the unauthorized user may be able to send email or other communications from the authorized user's email account.

In light of the sensitive data stored by mobile devices and the important functions provided by mobile devices, security measures have been developed. One of the oldest security measures is to require a user to input a user ID and a password to access data and/or functions of a mobile device. While this measure is commonly used, people usually do not select strong passwords. One reason for poor password selection is that a password that is strong or difficult to guess is also hard to remember.

Another conventional method used to protect data stored on a mobile device is encryption. If sensitive data is encrypted, when a mobile device is lost, the unauthorized user may not be able to access the data without knowing the encryption key. One problem with encryption is that it requires specialized hardware and/or software. Another problem with encryption is that it relies on security of the user's key or password.

Still other mobile device security measures that have been implemented include tracking mechanisms and automatic disable or erase mechanisms. For example, computer services have been developed that track mobile devices. For example, one service includes software that runs in the background on laptop computers. The software disables the speaker on the computer's modem and automatically dials a number corresponding to a monitoring center. The monitoring center can be configured to erase all of the data from the computer's hard disk drive once contact is achieved after the monitoring center has been notified that the computer has been stolen.

One problem with data delete services, such as the one described in the above-referenced paragraph, is that these services do not allow users to define a hierarchy of security actions depending on the context of loss of the mobile device. For example, it may not be desirable to delete all of the data from the hard disk drive of a mobile device if the user has only temporarily misplaced the device. Using conventional data delete services, the data on such a device would be deleted. There is no ability to define a less severe action to be performed for temporary misplacement followed by a more severe action once it is learned or suspected that the device has been stolen.

Another problem with conventional data protection services such as the data delete service described above, is that such services require that the device be connected to a network in order to operate. When a mobile device goes out of range or is otherwise prevented from connecting to a network, the data protection service is unable to implement the security function.

Accordingly, in light of these difficulties associated with conventional mobile device security mechanisms, there exists a need for improved methods, systems, and computer program products for providing context-based, hierarchical security for a mobile device.

SUMMARY

According to one aspect, the subject matter described herein includes a method for providing context-based, hierarchical security for a mobile device. The method includes storing a hierarchy of security actions for at least one of protecting data stored on a mobile device and preventing unauthorized use of the mobile device. The hierarchy includes a plurality of levels. Each level includes at least one context-based security action. Different context-based security actions may be specified for different security levels. At least one security action associated with a first security level is performed in response to the existence of a first context associated with the first security level. At least one security action associated with a second security level is performed in response to the existence of a second context associated with the second security level.

According to another aspect, the subject matter described herein includes a method for providing context-based, hierarchical security for a mobile device. The method includes providing a configuration interface for receiving a plurality of security instructions specifying security actions for protecting a mobile device and for receiving triggering event definitions defining events for triggering the security actions. The security actions are adapted to protect data stored on the mobile device and/or to prevent unauthorized use of a mobile device. Security instructions and triggering event definitions for protecting a mobile device are received via the configuration interface. The security instructions and triggering event definitions are associated with different security levels in a hierarchy including a plurality of security levels.

According to yet another aspect, the subject matter described herein includes a system for providing context-based, hierarchical security for a mobile device. The system includes a mobile device security database for storing a hierarchy of security instructions defining security actions for at least one of protecting data stored on a mobile device and preventing unauthorized use of the mobile device. The hierarchy includes at least two security levels and each level includes at least one security instruction. A mobile device security manager performs at least one security action associated with a first security level in response to the existence of a first context associated with the first security level and performs at least one security action associated with a second security level in response to the existence of a second context associated with the second security level.

The security actions implemented by the subject matter described herein may include any action designed to prevent unauthorized access to or use of a mobile device. Examples of such actions include:

- deleting user-specified data from the mobile device;
- encrypting user-specified data stored on the mobile device, where such encryption may be based on a key provided by the mobile device security manager or generated by the mobile device;
- moving user-specified information from the mobile device to a secure storage location;
- activating password-only access to the mobile device;
- deactivating one or more functions of the mobile device, such as placing calls, viewing stored data, sending messages, Internet browsing, etc.;
- sending a text message to the mobile device instructing a user/finder of the mobile device to return the mobile device (such as call a number);
- automatically placing a call to the mobile device at a user-specified interval to play a recorded message instruction the user regarding action the user should take to return the mobile device;
- activating a ringer on the mobile device to facilitate location of the mobile device;
- disabling all outgoing calls except for one phone number to the security manager or user;
- forcing all outgoing calls to a single phone number, which may correspond to the security manager or user;
- recording and reporting all device usage to the security manager, where usage information may include calls placed, calls received, web sites visited, emails sent or received, text messages sent or received, other file types sent or received, etc.; and/or
- activating location tracking via GPS, base station triangulation, or other suitable tracking mechanism.

Any of the above-listed security actions may be defined or selected by a user or operator, associated with a security level and a triggering event, and stored in a database. Once the security level for a mobile device is set, and a triggering event is detected, the corresponding security action may be performed.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Preferred embodiments of the subject matter described with reference to the accompanying drawings of which.

DETAILED DESCRIPTION

Figure 1:
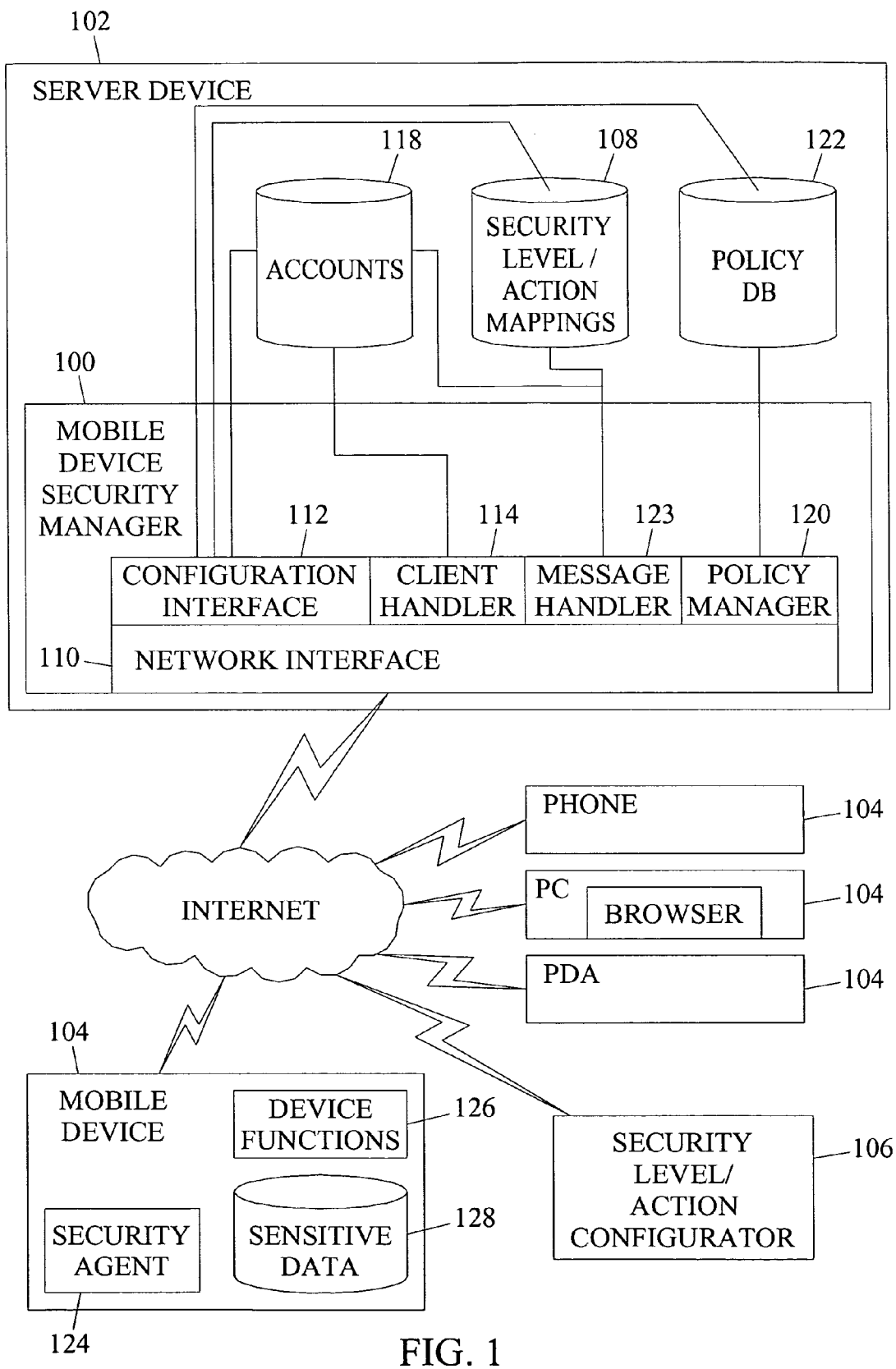
FIG. 1 is a block diagram illustrating a system for context-based, hierarchical security for a mobile device according to an embodiment of the subject matter described herein.

According to one aspect, the subject matter described herein includes a system for providing context-based, hierarchical security for a mobile device where portions of the system are implemented on a mobile device and other portions are implemented on a device that is separate from the mobile device being protected. FIG. 1 illustrates one exemplary architecture according to an embodiment of the subject matter described herein. Referring to FIG. 1, a mobile device security manager 100 located on a server 102 includes functionality for protecting data and unauthorized access to mobile devices 104. In the illustrated example, mobile devices 104 include phones, personal computers, and personal digital assistants. For simplicity of illustration, only one mobile device 104 is shown in detail. It is understood that the remaining mobile devices 104 may be similarly configured with regard to security functions.

Mobile device security manager 100 allows a security level/action configurator 106 to define security instructions and triggering events and to associate these items with security levels. The security instructions may define security actions for protecting the mobile device. The security instructions, triggering events, and the mappings between these items and security levels may be stored in security database 108. Database 108 may store security instructions, triggering event definitions, and mappings for a plurality of users who subscribe to the mobile device security service provided by mobile device security manager 100.

In order to allow user configuration of the security instructions, triggering events, and mappings, mobile device security manager 100 may include a network interface 110 and a configuration interface 112. Network interface 110 may be any suitable interface for communicating messages over a network. In one exemplary implementation, network interface 110 may be a TCP/IP protocol stack. Configuration interface 112 may be any suitable interface that allows a user to define security level/action mappings. In one exemplary implementation, configuration interface 112 may be a graphical user interface.

Mobile device security manager 100 also includes a client handler 114 for accessing user-specific accounting information stored in accounts database 118. Mobile device security manager 100 may also include a policy manager 120 for interpreting policies stored in a policy database 122 for determining whether the security level associated with a device should be changed, for example based on an organizational security policy. A message handler 123 handles communications between mobile devices 104 and mobile device security manager 100.

Each mobile device 104 includes a security agent 124 for obtaining security levels and corresponding security actions from mobile device security manager 100. Each mobile device 104 may also include device functions 126 and sensitive data 128. For example, if mobile device 104 is a mobile telephone, device functions 126 may include mobile telephony functions, and sensitive data 128 may include user-entered data, such as a list of personal telephone numbers, e-mail addresses, digital images, e-mails, text messages, etc., stored in device memory and/or on removable storage media, such as a SIM card.

In operation, each mobile device 104 receives security instructions, triggering events, and mappings to security levels from mobile device security manager 100. Each mobile device may also receive a current security level setting from mobile device security manager 100. Security agent 124 reads the security levels, actions, and triggering events and determines whether a context associated with the current security level exists. If the context exists (i.e., if a triggering event is detected), security agent 124 may implement the corresponding security action to protect device functions 126 and/or sensitive data 128.

The system illustrated in FIG. 1 includes means for storing a hierarchy of security instructions defining security actions for protecting data stored on a mobile device and/or preventing unauthorized use of the mobile device, where the hierarchy includes at least two levels and each level includes at least one security instruction. For example, security database 108 may store the hierarchy of security instructions. The system illustrated in FIG. 1 may also include means for performing at least one security action associated with the first security level in response to the existence of a first context associated with the first security level, such as a loss of the mobile device. For example, mobile device security manager 100 may perform a security action, such as visually or audibly notifying a possessor of a mobile device of instructions for returning the mobile device to the owner. The system illustrated in FIG. 1 may also include means for performing at least one security action associated with a second security level in response to the existence of a second context associated with the second security level. For example, security manager 100 illustrated in FIG. 1 may automatically move to a second security level after being in the first security level for a predetermined time period indicating that a mobile device has likely been stolen. The security action associated with the second security level may, for example, include locking the mobile device and/or encrypting sensitive data stored on the mobile device.

Figure 2:
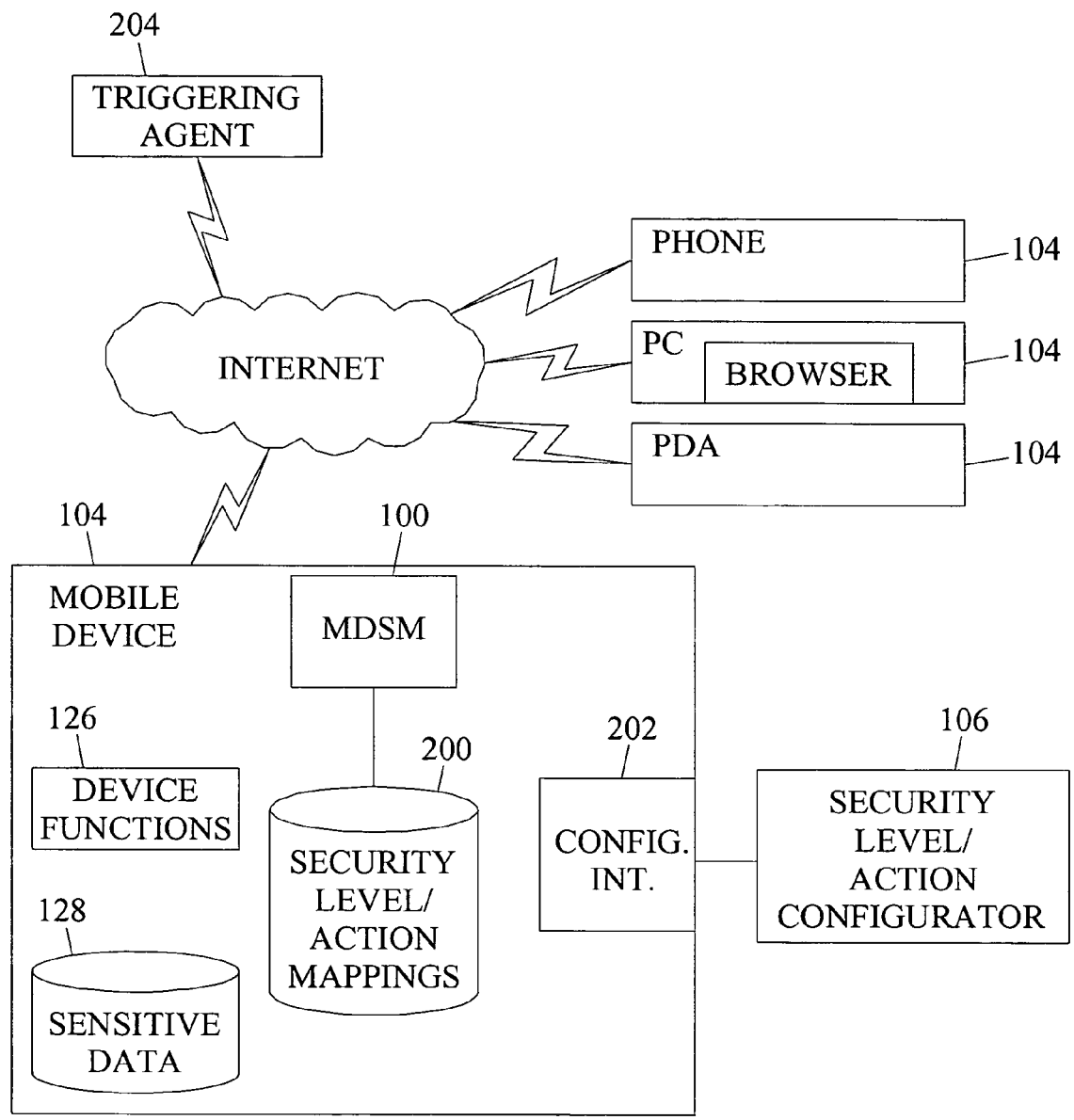
FIG. 2 is a block diagram illustrating a system for implementing context-based, hierarchical security of a mobile device according to an alternate embodiment of the subject matter described herein.

In FIG. 1, mobile device security manager 100 and security database 108 are located on a server remote from mobile device 104. In an alternate implementation of the subject matter described herein, the mobile device security manager, the security database, or any of the other functions residing on server 102 may reside on the mobile device. Such an implementation allows security functions to operate even when the mobile device is not in communication with a network connected to a network based mobile device security manager. FIG. 2 illustrates an exemplary architecture in which the mobile device security manager is located on a mobile device according to an embodiment of the subject matter described herein. Referring to FIG. 2, mobile device security manager 100 is located on mobile device 104. Mobile device 104 may include a security database 200, which stores security instructions, triggering events, and mappings to security levels for protecting device functions 126 and/or sensitive data 128 of the particular mobile device 104. Security database 200 may be modified via security level/action configurator 106 via a configuration interface 202. Configuration interface 202 may be any suitable interface for modifying security instructions, triggering events, or mappings to security levels stored on mobile device 104. For example, configuration interface 202 may be a web interface or a mobile device keypad interface. Security level/action configurator 106 may be software that executes on mobile device 104 or on a computer separate from mobile device to define the appropriate security actions and triggering events.

A triggering agent 204 may trigger security actions defined in database 200 by sending a message to mobile device, for example, in response to notification from the mobile device user that the device is lost. Alternatively, to provide security when triggering agent 204 is unreachable, mobile device security manager 100 may periodically poll triggering agent 204 and receive acknowledgements to the polls. If an acknowledgement is not received within a predetermined time period, mobile device security manager 100 may trigger security actions.

Figure 3:
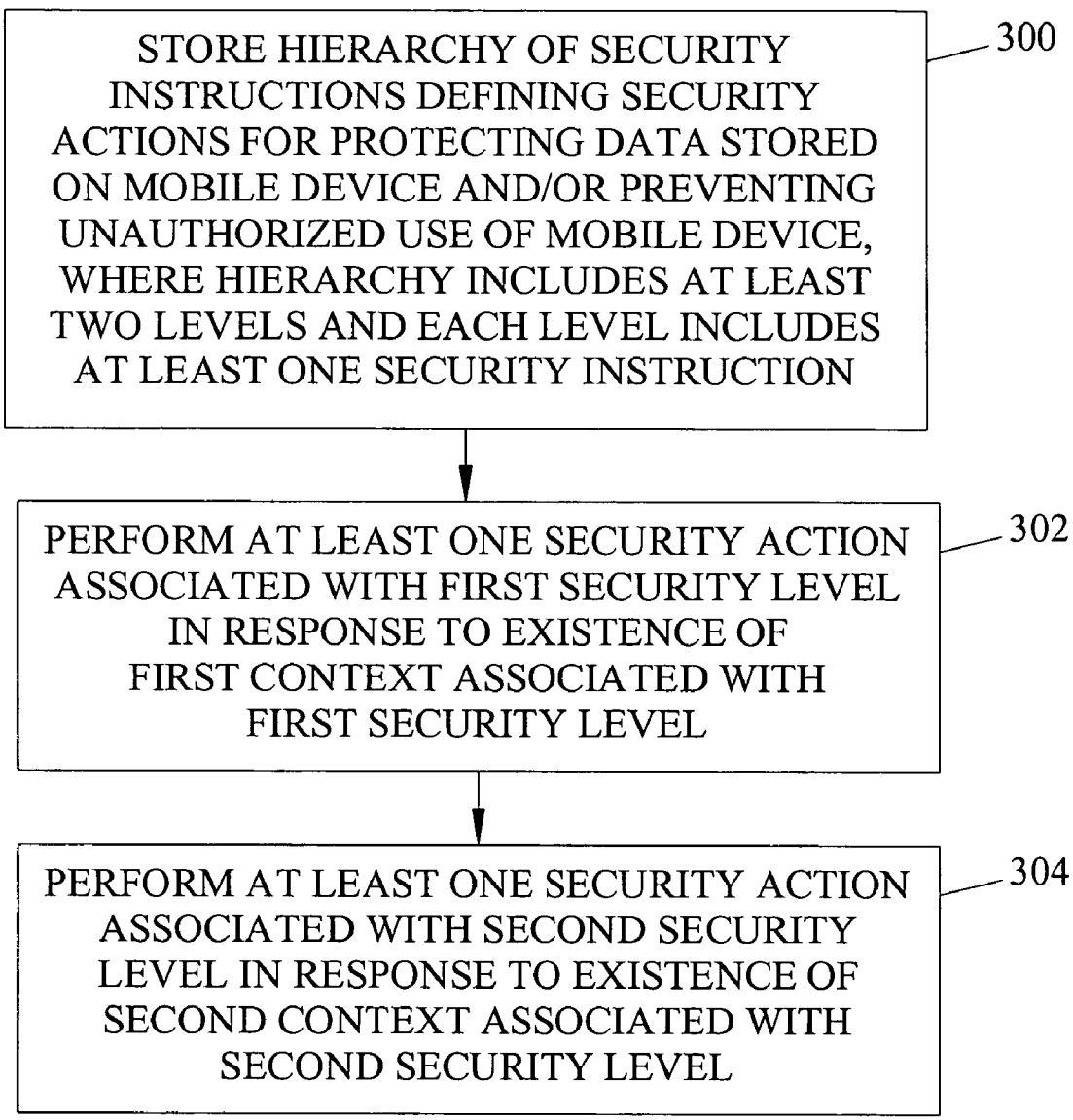
FIG. 3 is a flow chart illustrating an exemplary process for providing context-based, hierarchical security for a mobile device according to an embodiment of the subject matter described herein.

FIG. 3 is a flow chart illustrating an exemplary process for implementing context-based, hierarchical security for a mobile device according to an embodiment of the subject matter described herein. Referring to FIG. 3, in block 300, a hierarchy of security instructions defining security actions for protecting data stored on a mobile device and/or preventing unauthorized use of the mobile device are stored. The hierarchy includes at least two levels. Each level may include at least one security instruction. Table 1 shown below illustrates an example of a hierarchy of security instructions for different security levels that may be implemented for protecting a mobile device according to an embodiment of the subject matter described herein.

TABLE 1

| | Mobile Device Security Level/Action Mappings | | | |
|---|---|---|---|---|
| | Security Level 1 | Security Level 2 | Security Level 3 | Security Level 4 |
| Context | Device missing, user notifies security manager or triggering agent | Device missing, device in level 1 for at least 30 minutes | Device missing, device in level 2 for at least one hour | Device missing, device in level 3 for at least three hours |

TABLE 1-continued

Mobile Device Security Level/Action Mappings

|  | Security Level 1 | Security Level 2 | Security Level 3 | Security Level 4 |
|---|---|---|---|---|
| Security instructions | 1. Activate ringer at user-specified interval.<br>2. Send text message asking to call user-specified number.<br>3. Move to security level 2 after 30 minutes. | 1. Send text message to mobile device instructing a user/finder of the mobile device on action the user/finder should take to return the device, such as calling a number.<br>2. Record and report all device usage to mobile device security manager.<br>3. Automatically place call to mobile device at some interval to play a recorded message instructing the user/finder of the mobile device on action the user/finder should take to return the device.<br>4. Move to security level 3 after one hour. | 1. Force all outgoing calls to one number (service number).<br>2. Encrypt user related information on the mobile device.<br>3. Activate password only access to the mobile device.<br>4. Move to security level 4 after three hours. | 1. Delete user related information from the mobile device.<br>2. Totally disable any usage of the device. |

From Table 1, it can be seen that the subject matter described herein can include a hierarchy of security actions where one action associated with one level is triggered from another level depending on the context associated with loss of the mobile device. Providing such a hierarchy is advantageous over conventional solutions where only a single action, such as deleting all of the data, is all that is available from a security service when a mobile device is lost.

Returning to FIG. 3, in block 302, the mobile device security manager performs at least one security action associated with a first security level in response to the existence of a first context associated with the first security level. Using Table 1 as an example, if the device is only been missing for a short time and the user is not sure why, the user may initiate security level 1.

Such initiation may be accomplished contacting security manager 100 or triggering agent 104. Security manager 100 or triggering agent 204 may send a message to the mobile device to initiate security level 1. Alternatively, security level 1 may be triggered automatically by mobile device 104 failing to receive an acknowledgement to a poll by mobile device 104.

As illustrated in Table 1, the security actions for level 1 may be activating the ringer at a user specified interval, sending a text message asking the current possessor to call a user specified number, and automatically moving to level 2 in response to being in level 1 a predetermined time period, such as 30 minutes. In block 304, at least one security action associated with the second security level is triggered in response to the existence of a second context associated with the second security level. The second context may be the fact that the device is missing and the device has been in level 1 for at least 30 minutes. Alternatively, or in addition, the second context may be based on another triggering event, such as an external trigger to initiate security level 2. When this occurs, the device may implement security actions for security level 2, which may include sending a text message to the mobile device instructing the user/finder on action the user/finder should take to return the device, recording and reporting all device usage to mobile device security manager 100, and automatically placing a call to the mobile device at predetermined intervals to play a recorded message instructing the user/finder on how to return the device. Security level 3 may be triggered after the device has been in security level 2 for more than one hour and/or by some external triggering means, as described further below.

The process illustrated in blocks 302 and 304 may be repeated for any of a number of security levels. In addition, in the example illustrated in Table 1, transition from one security level is performed automatically based on user-specified time periods elapsing. However, the subject matter described herein is not limited to automatically transitioning between security levels based on the passage of time. In an alternate implementation, such as when the user knows that a device has been stolen, the user may manually trigger the device to start in level 4, for example by having mobile device security manager 100 or triggering agent 204 send a message to the mobile device to have the device start operating in security level 4.

Figure 4:
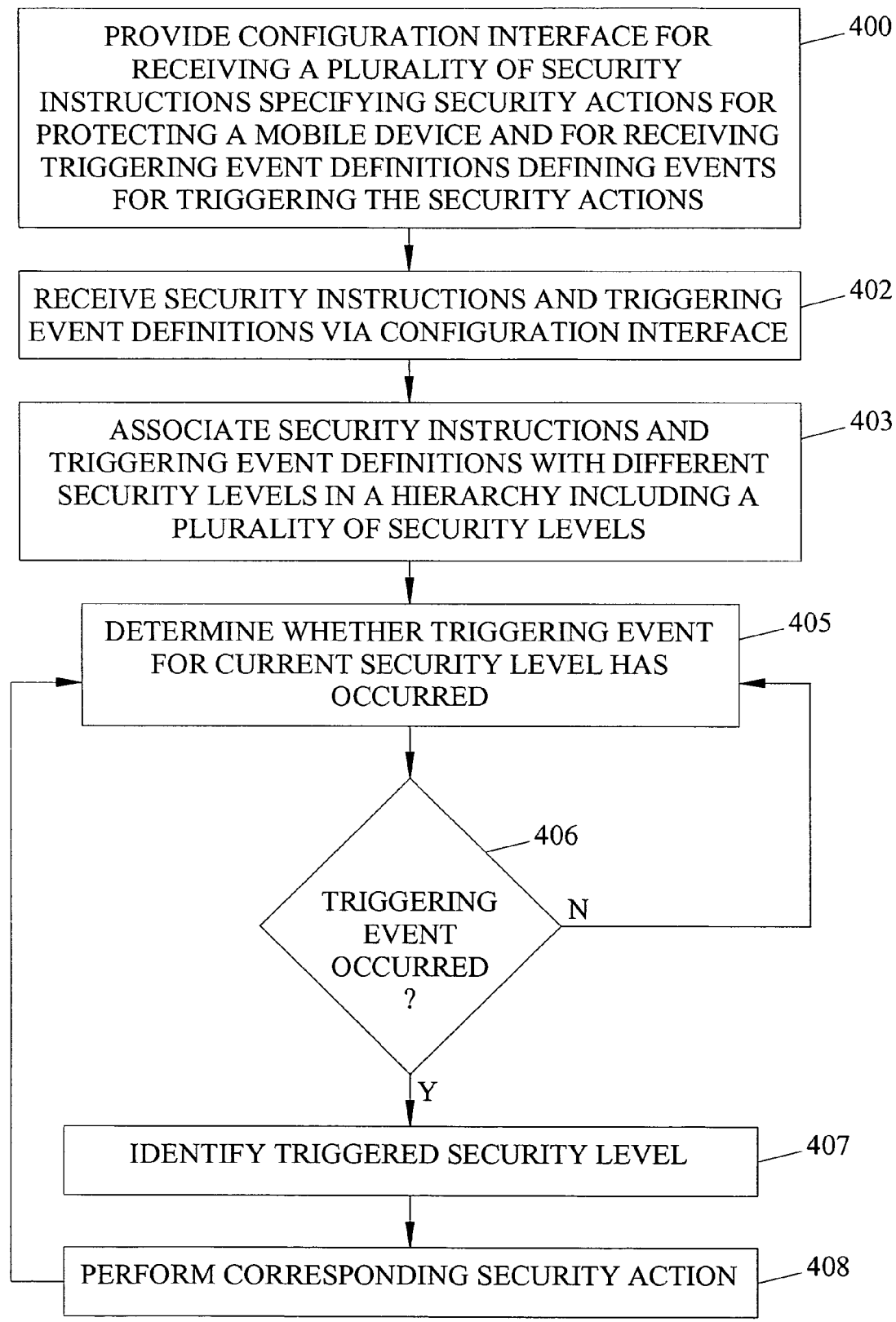
FIG. 4 is a flow chart illustrating an exemplary process for configuring a mobile device to implement context-based, hierarchical security and for implementing such security for the device according to an embodiment of the subject matter described herein.

According to another aspect, the subject matter described herein includes a method for configuring a mobile device to implement context-based hierarchical security and for implementing such security for the device. FIG. 4 is a flow chart illustrating one example of such a method. Referring to FIG. 4, in block 400, a configuration interface is provided for receiving a plurality of security instructions specifying security actions for protecting a mobile device and for receiving triggering event definitions defining events for triggering the security actions. In block 402, security instructions and triggering event definitions are received via the configuration interface. In block 403, the security instructions and triggering event definitions are associated with different security levels in a hierarchy including a plurality of security levels.

In blocks 405 and 406, it is determined whether a triggering event has occurred. The triggering event may be initiated locally by the authorized user via a keypad associated with the mobile device or remotely by sending a message from security manager 100. Alternatively, the triggering event may be initiated automatically based on time of day or in response to receipt of sensitive data. If a triggering event has not occurred, control returns to block 405 where the device continues to check whether a triggering event has occurred. Once it is determined in block 406 that a triggering event has occurred, it is determined in block 407 which security level has been triggered based on the triggering event. Once the security level is known, control proceeds to block 408 where one or more security actions associated with the triggered security level may be performed. The current security level for a device may also be changed using any of these mechanisms.

In one refinement of the subject matter described herein, the security instructions sent from security manager 100 to mobile device 104 may be transmitted more than once and/or until a confirmation is received from the mobile device 104. For example, a timeout and retransmission protocol may be used to re-send a security instruction if an acknowledgement receipt is not received within a timeout period. However, retransmitting the message will not result in the security action being triggered if the device is not connected to a network. Accordingly, in a further refinement, the security agent of each mobile device 104 may automatically poll security manager 100 for security instructions, and if no response is received, the device may prevent initialization, encrypt all data, delete all data, or perform some other user specified action.

In yet another refinement, in order to prevent data that has been erased by a security action from being recovered by an unauthorized user, security manager 100 or security agent 124 may rewrite over deleted data in corresponding clusters of the hard disk drive of a mobile device or delete clusters of predetermined number of times. Writing over data or deleting data of predetermined number of times prevents the data from being recaptured from the hard disk drive.

In yet another refinement, as illustrated in FIG. 2, the entire security manager or security agent function may reside on the mobile device. Such a manager function may be in the form of downloadable software that is downloaded to the mobile device that is compatible with the operating system of the mobile device. Using downloadable software to implement the security manager or security agent enables security to be provided for off-the-shelf mobile devices.

In yet another refinement of the subject matter described herein, the security manager or the security agent may partition data on the mobile device according to its sensitivity. For example, nonsensitive data may be partitioned and stored separately from sensitive data. When a security action such as deleting, encrypting, or over writing data, is requested, the security action may be performed only for the sensitive data.

In yet another refinement, the security manager or the security agent may provide a list of files or other data to be acted upon in predetermined context. For example, when a device has been lost, the user may receive a list of files via a web interface or an email listing the files present on the mobile device. The user can then select the files that are to be acted upon by the security manager or the security agent. Once the user selects the files to be deleted or encrypted, the security manager sends an instruction to the device to encrypt or delete the appropriate files. By providing such a selective security method, the subject matter described herein provides an advantage over conventional security systems that do not distinguish between different data types.

Although some of the examples described above indicate that a mobile device may be activated in one security level and may proceed sequentially to higher security levels in response to the existence of contexts or the occurrence of triggering events associated with such levels, the subject matter described herein is not limited to such examples. In an alternate example, a mobile device may be activated without being in a security level, and the security manager may continually check for the existence of a context or the occurrence of a triggering event associated with any of a plurality of security levels. In response to the existence of a context or the occurrence of a triggering event, a security action associated with the triggered security level may be performed, where the triggered security level can be any of the defined security levels.

Exemplary Operating Scenario

The following is an example of operation of the subject matter described herein in providing context-based, hierarchical security for a mobile device.

1. User A, a celebrity, is tired of having her personal data posted without authorization on public web servers, so User A goes shopping for a new mobile device or service.
2. User A begins speaking with a service provider salesperson and informs the salesperson that she wants to protect the email addresses, telephone numbers, and pictures on her phone. User A also explains that if she determines that the phone has been stolen, she wants the data to be destroyed automatically.
3. The salesperson explains that there is a new technology. The technology is a software agent that can be installed on the phone and interact with the service to help protect the data. Alternatively, the entire program can be downloaded to the phone. The agent has configurable security levels that allow security to be increased based on danger level determined by the end user.
4. User A agrees to purchase the service and ask the salesperson to configure the phone for her.
5. The salesperson installs the agent on the phone and configures it to have three security levels. The first two security levels will require User A to initiate an action through the data protection service provided by the service provider. The third level may be triggered manually, like levels 1 and 2. Alternatively, the third level may be configured as a logic bomb that will automatically trigger after a predetermined time period so that no action by User A is needed.

6. User A begins setting security level 1 (low threat) using some standard policies available via the data protection service. The salesperson configures the settings so that when User A contacts the data protection service or logs into a secure website to initiate threat level 1, the phone is placed into a limited functionality mode. In the limited functionality mode, calls can only be made to emergency services, such as 911 or to any other numbers that User A designates. Minutes and long distance calling will be limited as well. Security level 1 allows for the event that someone has borrowed the phone without permission. It can still be used in emergency situations and for return of the phone. User A agrees that this will be good since her sister mistakenly takes her phone from time to time and might need to use the phone to call her about the mistake.

7. The salesperson next configures security level 2 (medium threat), which executes tighter security actions on the phone. The salesperson tells User A that security level 2 is used when the phone is missing, but it is likely that the phone will be returned. In addition to the security actions for the security level 1, security level 2 enables the email addresses, phone numbers, and pictures to be encrypted with a secret key. The key may be made available to User A when she contacts a service provider or logs into a secure website. Implementation of this level is important in that the user's data will be protected and can still be recovered.

8. Now the salesperson configures security level 3 (high threat) which indicates that User A thinks the phone is lost or stolen and wants to ensure that no one can get the data. The implementation of this level is important that User A's data will be destroyed but the phone will still be operable if User A should locate it. The salesperson explains the choices available for initiating this threat level and that it can be automatic or required the end user to initiate a sequence. In this example, it is assumed that security level 3 will be entered if security level 2 has been active for at least two weeks. The trigger can be disarmed if the phone is reset to level 0 (no security) or to a lower security level.

9. Now that the agent has been configured, it may be synchronized with the security manager.

10. Once the agent is activated, it can be remotely enabled by security manager 100 to protect the device. It should also be noted that levels 1 and 2 can be implemented if User A would like to loan her phone to someone else.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for providing context-based, hierarchical security for a mobile device, the method comprising:

storing a hierarchy of security actions for at least one of protecting data stored on a mobile device and preventing unauthorized use of the mobile device, the hierarchy including a plurality of security levels, each security level including at least one context-based security action;

performing at least one security action associated with a first security level in response to the existence of a first context associated with the first security level; and performing at least one security action associated with a second security level in response to the existence of a second context associated with the second security level.

2. The method of claim 1 wherein storing a hierarchy of security actions includes storing the hierarchy of security actions on a server separate from the mobile device.

3. The method of claim 1 wherein storing a hierarchy of security actions includes storing the hierarchy of security actions on the mobile device.

4. The method of claim 1 wherein performing the at least one security action associated with the first security level includes attempting to contact a possessor of the mobile device using the mobile device.

5. The method of claim 4 wherein attempting to contact the possessor of the mobile device includes triggering the mobile device to audibly contact the possessor.

6. The method of claim 4 wherein attempting to contact a possessor of the mobile device includes triggering the mobile device to visually contact the possessor.

7. The method of claim 1 wherein performing the at least one security action associated with the first security level includes performing the at least one security action associated with the first security level in response to receiving a message from a server located remotely from the mobile device.

8. The method of claim 1 wherein performing the at least one security action associated with the first security level includes performing the at least one security action associated with the first security level in response to failing to receive a message from a server located remotely from the mobile device.

9. The method of claim 1 wherein performing the at least one security action associated with the second security level includes automatically performing the at least one security action associated with the second security level in response to the mobile device being in the first security level for a predetermined time period.

10. The method of claim 1 wherein performing the at least one security action associated with the second security level includes performing the at least one security action associated with the second security level in response to receiving a message from a server located remotely from the mobile device.

11. The method of claim 1 wherein performing the at least one security action associated with the second security level includes performing the at least one security action associated with the second security level in response to failing to receive a message from a server located remotely from the mobile device.

12. The method of claim 1 wherein performing the at least one security action associated with the second security level includes deleting data associated with the mobile device.

13. The method of claim 1 wherein performing the at least one security action associated with the second security level includes disabling at least one function of the mobile device.

14. The method of claim 1 wherein performing the at least one security action associated with the first or the second security level includes at least one security action selected from a group including encrypting user-specified data stored on the mobile device, moving user-specified data stored on the mobile device to a secure location, activating password-only access to the mobile device, recording usage of the mobile device, activating location tracking of the mobile device, and limiting at least one function of the mobile device.

15. A method for providing context-based, hierarchical security for a mobile device, the method comprising:
providing a configuration interface for receiving a plurality of security instructions defining security actions for protecting a mobile device against unauthorized access and for receiving triggering event definitions for triggering the security actions;
receiving security instructions and triggering event definitions via the configuration interface; and
associating the security instructions and triggering event definitions with different security levels in a hierarchy including a plurality of security levels, wherein each security level is associated with a context.

16. The method of claim 15, further comprising:
determining whether a triggering event has occurred;
in response to determining that the triggering event has occurred, determining which security level has been triggered; and
performing at least one corresponding security action associated with the triggered security level.

17. The method of claim 15 wherein providing a configuration interface includes providing the configuration interface on the mobile device.

18. The method of claim 15 wherein providing a configuration interface includes providing the configuration interface on a server separate form the mobile device.

19. The method of claim 16 comprising, in response to determining that a triggering event has occurred, sending a message to the mobile device to trigger the security action.

20. The method of claim 19 wherein sending the message includes periodically sending the message until an acknowledgement is received.

21. The method of claim 16 wherein determining whether a triggering event has occurred includes sending a message to a security manager, and, in response to failing to receive a response from the security manager, determining that the triggering event has occurred and performing a default security action.

22. The method of claim 21 wherein performing a default security action includes disabling at least one function of the mobile device.

23. The method of claim 21 wherein performing a default security action includes deleting data stored on the mobile device.

24. The method of claim 16 comprising partitioning data stored on the mobile device into sensitive and nonsensitive data and wherein performing at least one security action associated with the triggered security level includes performing the at least one security action with respect to the sensitive data.

25. The method of claim 16 wherein performing at least one security action associated with the triggered security level includes presenting, to a user, a list of data to be protected, receiving input from the user regarding selected data to be protected and performing the security action to protect the selected data.

26. The method of claim 16 wherein performing at least one security action associated with the triggered security level includes performing at least one security action selected from a group including encrypting user-specified data stored on the mobile device, moving user-specified data stored on the mobile device to a secure location, activating password-only access to the mobile device, recording usage of the mobile device, activating location tracking of the mobile device, and limiting at least one function of the mobile device.

27. A system for providing context-based, hierarchical security for a mobile device, the system comprising:
a mobile device security database for storing a hierarchy of security instructions defining security actions for at least one of protecting data stored on a mobile device and preventing unauthorized use of the mobile device, wherein the hierarchy includes at least two security levels and each level includes at least one security instruction; and
a mobile device security manager for, based on the security instructions stored in the mobile device security database, performing at least one security action associated with a first security level in response to the existence of a first context associated with the first security level and for performing at least one security action associated with a second security level in response to the existence of a second context associated with the second security level.

28. The system of claim 27 wherein the mobile device security database and the mobile device security manager are located on a server separate from the mobile device.

29. The system of claim 28 comprising a security agent located on the mobile device for communicating with the mobile device security manager and configured to obtain and implement the security instructions corresponding to the security levels.

30. The system of claim 29 wherein, in response to the existence of the first context, the mobile device security manager is adapted to send a message to the security agent to communicate the security instruction to the security agent.

31. The system of claim 30 wherein the mobile device security manager is adapted to periodically send the message to the security agent.

32. The system of claim 29 wherein the security agent is adapted to periodically attempt to contact the mobile device security manager, and, in response to failing to contact the mobile device security manager within a predetermined time period, to perform a default security action.

33. The system of claim 27 wherein, in performing the at least one security action, the mobile device security manager is adapted to contact a possessor of the mobile device.

34. The system of claim 33 wherein, in contacting the possessor of the mobile device, the mobile device security manager is adapted to send an audible message to the possessor of the mobile device.

35. The system of claim 33 wherein, in contacting the possessor of the mobile device, the mobile device security manager is adapted to send a visual message to the possessor of the mobile device.

36. The system of claim 27 wherein the mobile device security manager is adapted to perform the at least one security action associated with the second security level automatically in response to the mobile device being in the first security level for a predetermined time period.

37. The system of claim 27 wherein the mobile device security manager is adapted to perform the at least one security action associated with the second security level in response to receiving a message from a server located remotely from the mobile device.

38. The system of claim 27 wherein the mobile device security manager and the security database are located on the mobile device.

39. The system of claim 38 wherein the mobile device security manager is adapted to perform the at least one security action associated with the second security level in response to failing to receive a message from a server located remotely from the mobile device.

40. A system for providing context-based, hierarchical security for a mobile device, the system comprising:
- means for storing a hierarchy of security actions for at least one of protecting data stored on a mobile device and preventing unauthorized use of the mobile device, the hierarchy including a plurality of security levels, each security level including at least one context-based security action;
- means for performing at least one security action associated with a first security level in response to the existence of a first context associated with the first security level; and
- means for performing at least one second security action associated with a second security level in response to the existence of a second context associated with the second security level.

41. A computer program product comprising computer-executable instructions embodied in a computer-readable medium for performing steps comprising:
- storing a hierarchy of security actions for at least one of protecting data stored on a mobile device and preventing unauthorized use of the mobile device, the hierarchy including a plurality of security levels, each security level including at least one context-based security action;
- performing at least one security action associated with a first security level in response to the existence of a first context associated with the first security level; and
- performing at least one second security action associated with a second security level in response to the existence of a second context associated with the second security level.

42. The computer program product of claim 41 wherein storing a hierarchy of security actions include storing the hierarchy of security actions on a server separate from the mobile device.

43. The computer program product of claim 41 wherein storing a hierarchy of security actions includes storing the hierarchy of security actions on the mobile device.

44. The computer program product of claim 41 wherein performing the first security action includes attempting to contact a possessor of the mobile device using the mobile device.

45. The computer program product of claim 44 wherein attempting to contact the possessor of the mobile device includes triggering the mobile device to audibly contact the possessor.

46. The computer program product of claim 44 wherein attempting to contact a possessor of the mobile device includes triggering the mobile device to visually contact the possessor.

47. The computer program product of claim 41 wherein performing at least one security action associated with the first security level in response to the existence of a first context includes performing the at least one security action associated with the first level in response to receiving a message from a server located remotely from the mobile device.

48. The computer program product of claim 41 wherein performing at least one security action associated with the first security level in response to the existence of a first context includes performing the at least one security action associated with the first security level in response to failing to receive a message from a server located remotely from the mobile device.

49. The computer program product of claim 41 wherein performing the at least one security action associated with the second security level includes automatically performing the at least one security action associated with the second security level in response to the mobile device being in the first security level for a predetermined time period.

50. The computer program product of claim 41 wherein performing the at least one security action associated with the second security level includes triggering the at least one security action associated with the second security level in response to receiving a message from a server located remotely from the mobile device.

51. The computer program product of claim 41 wherein performing the at least one security action associated with the second security level includes triggering the at least one security action associated with the second security level in response to failing to receive a message from a server located remotely from the mobile device.

52. The computer program product of claim 41 wherein performing the at least one security action associated with the second security level includes deleting data associated with the mobile device.

53. The computer program product of claim 41 wherein performing the at least one security action associated with the second security level includes disabling at least one function of the mobile device.

54. The computer program product of claim 41 wherein performing the at least one security action associated with the first or the second security level includes at least one security action selected from a group including encrypting user-specified data stored on the mobile device, moving user-specified data stored on the mobile device to a secure location, activating password-only access to the mobile device, recording usage of the mobile device, activating location tracking of the mobile device, and limiting at least one function of the mobile device.

* * * * *

UNITED STATES PATENT AND TRADEMARK OFFICE
CERTIFICATE OF CORRECTION

PATENT NO. : 7,304,570 B2 Page 1 of 1
APPLICATION NO. : 11/200611
DATED : December 4, 2007
INVENTOR(S) : Ted Thomas It is certified that error appears in the above-identified patent and that said Letters Patent is hereby corrected as shown below:

Column 13, line 29, "form" should read --from--

Signed and Sealed this

Fourth Day of November, 2008

JON W. DUDAS
*Director of the United States Patent and Trademark Office*